(12) United States Patent
Krueger et al.

(10) Patent No.: US 6,591,178 B2
(45) Date of Patent: Jul. 8, 2003

(54) VEHICLE TRACTION CONTROL WITH ROUGH ROAD CORRECTION

(75) Inventors: Eric Edward Krueger, Ann Arbor, MI (US); Raymond Kurt Schubert, Mountain View, CA (US); Keith Wayne Beyer, Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 4 days.

(21) Appl. No.: 09/969,540

(22) Filed: Oct. 2, 2001

(65) Prior Publication Data

US 2003/0065435 A1 Apr. 3, 2003

(51) Int. Cl.[7] .............................................. B60K 41/20
(52) U.S. Cl. ........................... 701/83; 701/84; 303/196; 180/197
(58) Field of Search .............................. 701/83, 84, 82, 701/90, 91; 303/196, 167, 139, 145; 180/197

(56) References Cited

U.S. PATENT DOCUMENTS

| | | | | |
|---|---|---|---|---|
| 4,946,015 A | * | 8/1990 | Browalski et al. | 477/186 |
| 5,009,294 A | * | 4/1991 | Ghoneim | 477/185 |
| 5,117,934 A | * | 6/1992 | Tsuyama et al. | 180/197 |
| 5,222,570 A | * | 6/1993 | Kawamura et al. | 180/197 |
| 5,357,788 A | * | 10/1994 | Kantschar et al. | 73/117.3 |
| 6,460,647 B1 | * | 10/2002 | Schmitt | 180/197 |

* cited by examiner

Primary Examiner—Michael J. Zanelli
(74) Attorney, Agent, or Firm—Robert M. Sigler (57) ABSTRACT

A traction control for a motor vehicle responds to detection of a rough road surface so as to shift control away from propulsion power reduction and toward brake control to an over-spinning driven wheel when the rough road surface is detected. This better adapts the traction control to a road surface that may have a high coefficient of friction but produces intermittent loss of traction due to wheel hop or normal force fluctuations due to the rough road surface. The lower power reduction is obtained by increasing a target brake pressure used to derive a brake pressure error signal from which from which a power reduction command is derived. A delta target brake pressure may also be increased to provide a higher target velocity for the driven wheel propulsion. For even higher levels of road roughness, the traction control reduces the gain of time derivative of a difference between a rotational wheel acceleration of the driven wheel and an undriven wheel rotational acceleration that contributes to the brake modulation, since wheel accelerations are of less use in controlling traction on such a road surface.

10 Claims, 8 Drawing Sheets

VEHICLE TRACTION CONTROL WITH ROUGH ROAD CORRECTION

TECHNICAL FIELD

The technical field of this invention is vehicle traction control.

BACKGROUND OF THE INVENTION

Motor vehicle traction control systems using both wheel brake and propulsion throttle control are provided on many vehicles, since they can share components and control algorithms with anti-lock brake controls that are used on the majority of vehicles. A typical known traction control system is responsive to wheel speed sensors on the driven and undriven wheels of the vehicle to detect excessive wheel spin (rotational speed) in a driven wheel and apply the brake to that wheel to reduce wheel speed to a target wheel speed that is greater than an undriven wheel speed by a calibrated target delta velocity. The target delta wheel velocity is calibrated to produce an improved traction between the tire and the road surface. But braking of an over-spinning wheel alone is not always an optimal traction control strategy on a smooth but low coefficient road surface, due to the extra heat and wear that may be produced. Thus, the systems supplement selected driven wheel braking with a throttle reduction command provided to the propulsion unit of the vehicle to reduce power to the driven wheels.

A rough road surface provides a challenge to such systems in that the road may actually have a high surface coefficient of friction; rather it is the roughness of the surface causing intermittent reduction in normal force of the wheel on the road surface that produces an intermittent loss of traction. Although the brakes can react sufficiently quickly to deal with such fast changing traction conditions, it is undesirable in many cases to attempt to force the vehicle engine to vary its power at such a high rate.

SUMMARY OF THE INVENTION

The invention is a method and apparatus for controlling the traction of a motor vehicle in which the control emphasis is changed in response to detection of a rough road surface so as to shift traction control of a specific wheel away from a reduction in propulsion power toward braking control of the wheel.

The method and apparatus of the invention control the traction of a driven wheel included in a plurality of wheels supporting a vehicle on a road surface with a propulsion unit supplying power to the driven wheel and a brake braking the driven wheel. Brake pressure to the driven wheel is modulated to maintain the speed of the driven wheel at a first target wheel speed greater than an undriven wheel speed of the vehicle by a calibrated delta target wheel speed value. A road roughness signal indicating a level of roughness of the road surface is provided. When the road roughness signal indicates a first level of road roughness, a first level of power reduction is provided to the driven wheel from the vehicle propulsion unit. But when the road roughness signal indicates a second level of road roughness greater than the first level of road roughness, a second level of power reduction less than the first level of power reduction is provided to the driven wheel from the propulsion unit.

The rough road signal is preferably derived from vertical body/wheel motion responsive sensors at one or more of the driven wheels and undriven wheels but may alternatively be derived from one or more of the wheel speed sensors. The method and apparatus of the invention preferably applies a greater calibrated target delta wheel speed value at the second level of road roughness than at the first level of road roughness. The method and apparatus of the control may further modulate brake pressure to the driven wheel in response to a time derivative of a difference between a rotational wheel acceleration of the driven wheel and an undriven wheel rotational acceleration, the time derivative having a derivative gain, with a first gain value when the road roughness signal indicates third level of road roughness and a second gain value lower in magnitude than the first gain value when the road roughness signal indicates a fourth level of road roughness greater than the third level of road roughness. Further objects and advantages of the invention will be apparent from the accompanying drawings and following description of a preferred embodiment.

DESCRIPTION OF THE PREFERRED EMBODIMENT

Figure 1:
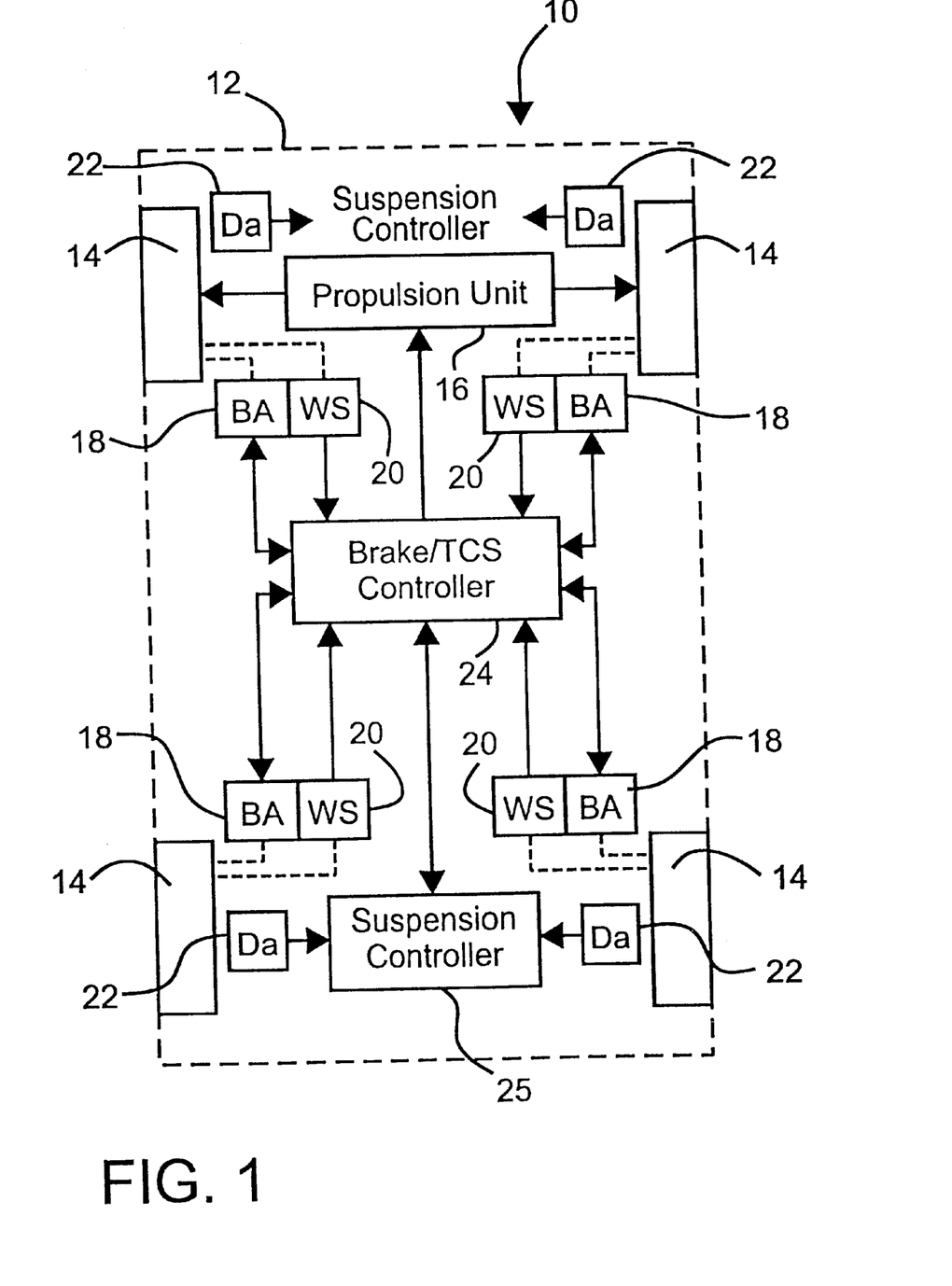
FIG. 1 is a schematic diagram of a vehicle with traction control according to the invention.

Referring to FIG. 1, a motor vehicle 10 has a body 12 on wheels 14, which in this embodiment are arranged in a typical front pair and rear pair. The wheels 14 of one pair, in this embodiment the front pair, are driven by a propulsion unit 16 that includes an engine or motor and a controller therefor in the usual manner. Each of wheels 14 is provided with a brake actuator (BA) 18, which may be a standard, fluid pressure operated disc or drum brake unit, and is further equipped with a standard wheel speed (WS) sensor 20 for providing signals of rotational wheel speed. The brake actuators 18 are actuated by pressurized brake fluid at a controlled brake pressure. A Brake/TCS Controller 24 includes a master cylinder, not shown, and a brake modulator unit 26 (shown in FIG. 2) capable of independently decreasing or increasing the pressure applied to each of the brake actuators 18 from the master cylinder pressure generated in response to an operator brake input in certain brake control modes such as, for example, anti-lock braking (ABS) and traction control (TCS). Brake/TCS Controller 24 is equipped with a programmed digital computer that receives the signals from wheel speed sensors 20 and provides output control mode and pressure (PWM) signals to the brake modulator unit 26 to control the brake pressure at individual wheels 14. Brake/TCS Controller 24 further, in its traction control (TCS) mode, provides a requested throttle signal to the controller of propulsion unit 16. In traction control, Brake/TCS Controller 24 generally generates both brake and throttle commands to control wheel spin so as to increase traction between the tires and the road surface.

A suspension controller 25 may be provided with signals from suspension component position sensors (Da) 22 located at each corner of the vehicle body. The sensors 22 provides signals of relative body/wheel position for use in the suspension controller in determining damper commands for controllable dampers; and in at least one embodiment described herein, these signals are also provided to brake/TCS controller 24 for a rough road determination. An example of such a suspension controller may be found in U.S. Pat. No. 5,570,288, issued Oct. 29, 1996.

Figure 2:
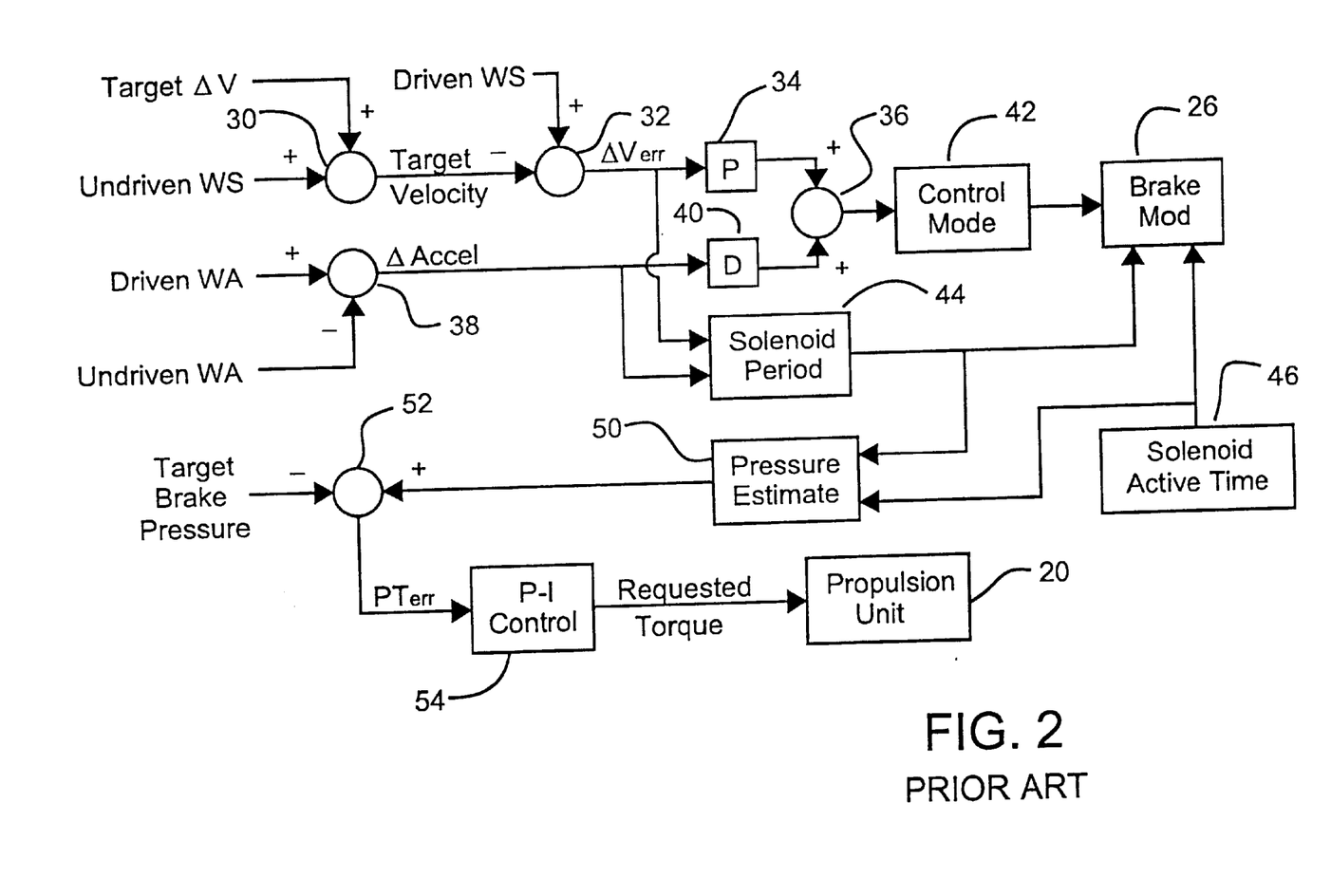
FIG. 2 is a schematic flow diagram of a basic traction control of the prior art that is part of the traction control system used in the vehicle of FIG. 1.

A traction control system is shown in FIG. 2. This system is known in the art; but it is the basic system upon which the described embodiments of this invention are built, by the additions shown in other Figures. Thus, it is described separately, for convenience and to more clearly point out what is new in the systems. The system as shown in FIG. 2 is applied to each driven wheel of the vehicle but will be described as applied to a single wheel. It begins in a summing block 30 by adding a target delta velocity Target $\Delta$V to the actual undriven wheel speed, which is indicative of true vehicle longitudinal velocity. Typically, the undriven wheel speeds are averaged to produce the undriven wheel speed value Undriven WS (the wheel speeds and accelerations described herein are all rotational, as is the target velocity). The result of this addition is a desired Target Velocity that is greater than the average undriven wheel speed by the delta amount. The driven wheel speed Driven WS is compared in a summing block 32 with the Target Velocity; and the output difference is the delta velocity error $\Delta$Verr. The latter value is processed in a proportional gain block 34 with a gain P; and the processed value is provided to one input of a summing block 36.

The driven wheel speed Driven WS is differentiated to provide a driven wheel acceleration value Driven WA. As with the driven wheel speed value, each driven wheel acceleration Driven WA is compared in a summing block 38 with an undriven wheel acceleration Undriven WA, typically the average of the individual undriven wheel accelerations; and the difference is a delta acceleration value $\Delta$Accel, which is processed in a derivative gain block 40 with a gain D and provided to the other input of summing block 36.

The output of summing block 36 is a total error signal provided to control mode block 42, which controls apply and release valves in brake modulator unit 26. The modulator unit includes a source of brake pressure separate from the master cylinder and contains an apply valve and a release valve for each brake actuator 18 to control the application of this brake pressure to individual wheel brake actuators. These valves are controlled in three possible modes: (1) in apply mode, the apply valve is open and the release valve is closed, with brake pressure increasing as a result; (2) in hold mode, both valves are closed, with brake pressure being held constant; and (3) in release mode, the apply valve is closed and the release valve is open, with brake pressure decreasing as a result. Control mode block 42 stores two threshold values; and the input signal from summing block 36 is compared with each. When the input value is below both threshold values, the release mode is selected. When the input value is between the threshold values, the hold mode is selected. Finally, when the input value is greater than both threshold values, the apply mode is selected.

A pulse width modulation signal is further available for use in control of the brake pressure. The values of $\Delta$Verr and $\Delta$Accel are provided to a solenoid period determination block 44 which determines a Solenoid Period value, generally from a lookup table. This value is provided to brake modulator unit 26 along with a generally constant value of Solenoid Active Time from a memory location or table 46. The two values together determine a PWM value for application of the apply valve and/or the release valve to provide control of the valve between its full open and full closed positions in the standard manner when the valve is open. The Solenoid Period controls the sensitivity of the control to the road surface, providing a higher PWM duty cycle to the apply or release valve, whichever is activated, as the Solenoid Period becomes shorter and a lower value as it becomes longer.

In operation, a driven wheel that has lost traction in acceleration and is spinning too rapidly will be braked to reduce the wheel speed to the Target Velocity, which is just above the average undriven wheel speed, with the difference controlled by the value of Target $\Delta$V. At this speed, a higher frictional force can be generated between the tire and the road surface; and traction is improved.

The algorithm further provides throttle control for the engine to reduce power to a driven wheel having an undesirably elevated wheel speed. The values of Solenoid Active Time and Solenoid Period are used in block 50 to determine a Pressure Estimate value of actual brake pressure for the wheel. This is compared in summing block 52 with a Target Brake Pressure value provided from memory or a lookup table as determined by suitable variables. The difference is a pressure error signal PT Error that is processed in a PI control 54 and provided to a throttle control 56 that is part of the controller in propulsion unit 16.

This system has worked well on comparatively smooth road surfaces in controlling traction when the power supplied to a driven wheel overcomes the surface coefficient of friction of the road. But propulsion power control is not optimal in traction control on a rough road that may actually have a high surface coefficient of friction producing an intermittent loss in traction, due to the slower response of the propulsion unit as compared with that of a driven wheel braking. Thus, this invention provides improvements to the brake controlling portion of the traction control algorithm described above so that less reliance is needed on the engine controlling portion of the algorithm during operation on rough roads. A preferred embodiment of these improvements is described with reference to the flow charts of FIGS. 3–6. The improvements are cumulative with increasing levels of roughness in the road surface.

Figure 3:
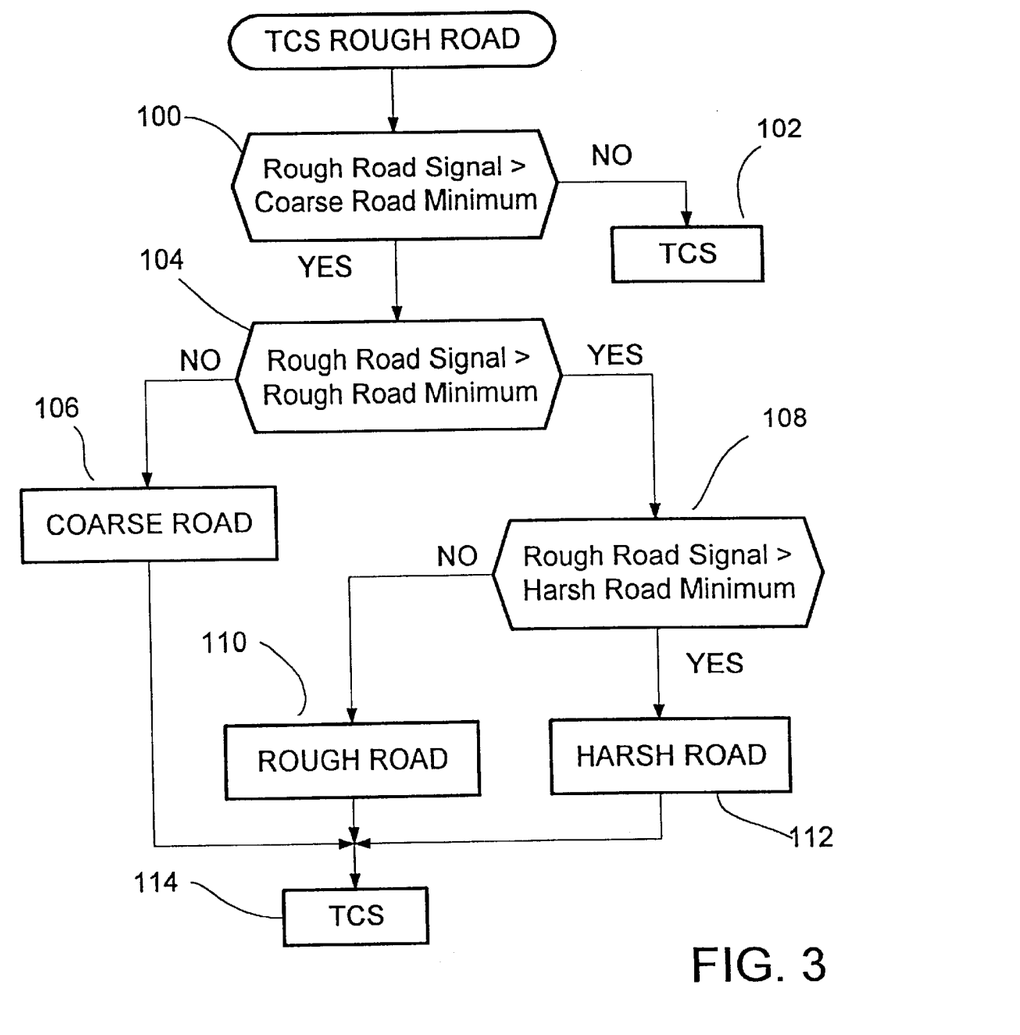
FIGS. 3–6 are flow charts of a computer routine illustrating a traction control system according to the invention for use in the vehicle of FIG. 1.

A main routine TCS ROUGH ROAD including such improvements is shown in FIG. 3. It should be stated at the outset that the concept of rough road used herein is a road surface with a highly varying surface height or a tendency to produce pronounced vertical wheel hop so that, although the road surface coefficient of friction may be high, the wheel cannot maintain good contact with a high normal force over a large contact patch. There are a variety of ways to detect rough road, including providing a signal based on suspension components or examining "noisy" wheel speed signals or wheel accelerations. In this embodiment, intended for use on a vehicle having a suspension control system, the suspension component approach is used.

A rough road signal may be derived from a suspension control system in the following manner. A vehicle with a suspension control such as suspension controller 25 may typically be provided at each wheel with suspension position or travel sensor 22: that is, a sensor providing an output signal of the relative vertical position or distance between that corner of the vehicle body and the vehicle wheel. Selected ones of these signals may be provided as outputs to Brake/TCS Controller 24 as indicated in FIG. 1. In this embodiment, the signals from the front wheels of the vehicle are so provided. In Brake/TCS Controller 24, these signals are sampled on a regular basis; and their absolute magnitudes are filtered to detect a peak value signal. The greater the roughness of the road surface, the greater will be the vertical wheel hop introduced and the greater will be the detected peak value signal. The larger of the detected peak value signals is filtered as desired and used as the rough road signal.

The flow chart of FIG. 3 shows a process in which a suspension controller outputs a road roughness signal having a numerical value (for example, a pulse width modulation between 0 and 100) and the TCS stores three predetermined roughness level boundary values within the 0 to 100 range (coarse road minimum, rough road minimum and harsh road minimum) that define four levels of roughness, increasing in degree: smooth road, coarse road, rough road and harsh road. In the initial step 100, the routine determines from the road roughness signal, received from the suspension control system, if the road roughness signal is greater than the coarse road minimum boundary value. If it is not, the level is smooth; and the routine exits at 102 to normal TCS operation, as embodied for example in the system of FIG. 2. Otherwise, the level is at least coarse road; and the routine proceeds from step 100 to step 104, at which it determines whether the road roughness signal is greater than the rough road minimum boundary value. If it is not, then the level is coarse road; and the routine proceeds at step 106 to call a subroutine COARSE ROAD and, upon return from this subroutine, exits to normal TCS operation with certain calibrated values tuned for a coarse road surface.

If the road roughness signal exceeds the rough road minimum boundary at step 104, the routine proceeds to step 108, at which it compares the roughness signal to a harsh road minimum boundary level. If it does not exceed the level, the program calls a subroutine ROUGH ROAD and, upon return from this subroutine, exits to normal TCS operation with certain calibrated values tuned for a rough road surface. If it does exceed the level, the routine calls a subroutine HARSH ROAD and, upon return from this subroutine, exits to normal TCS operation with certain calibrated values tuned for a harsh road surface.

Figure 4:
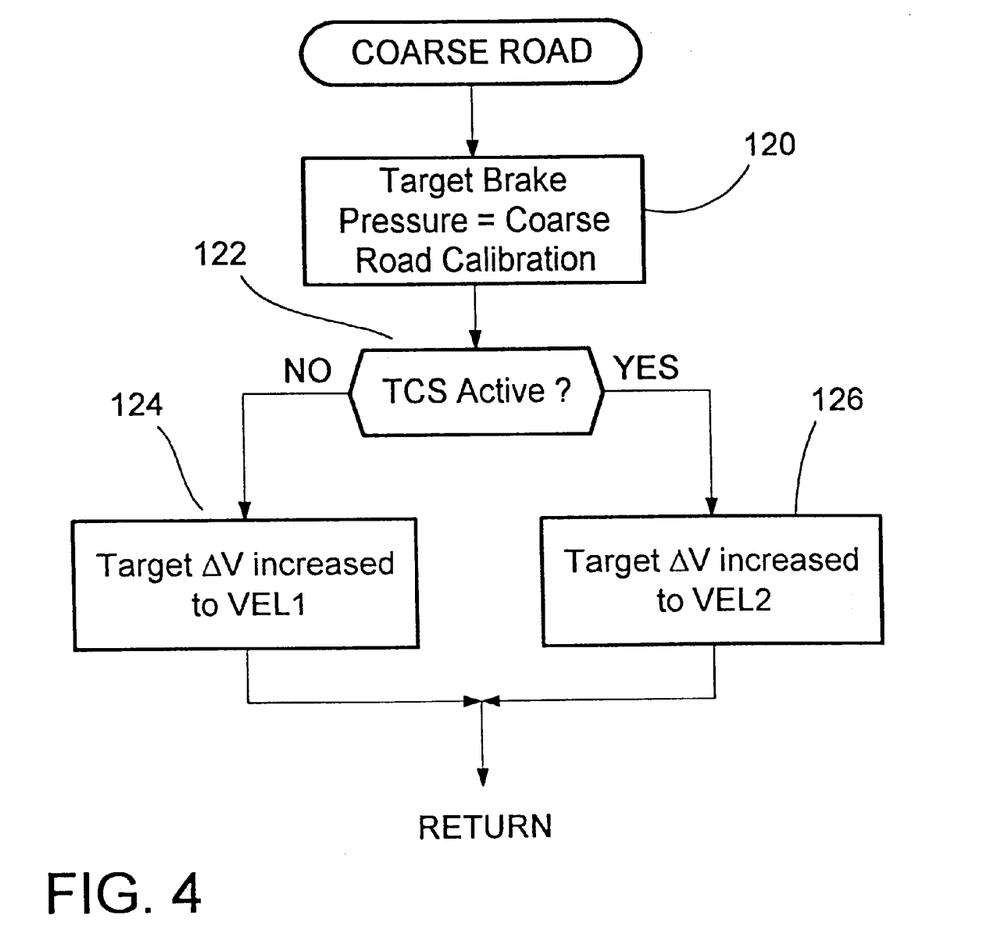

Subroutine COARSE ROAD is described with reference to the flow chart of FIG. 4. At step 120 the value of Target Brake Pressure is set to a calibrated Coarse Road value. This value is higher than the normal, smooth road value and thus produces a smaller PTerr value output from summing junction 52 in FIG. 2. In turn, this produces a smaller throttle reduction applied to propulsion unit 20. The greater wheel speed over-spinning will be controlled by the braking portion of the traction control system; and the primary method of traction control is thus shifted away from power reduction to driven wheel braking. At step 122 the subroutine determines if TCS is active. If it is active, at step 124 the value of Target $\Delta V$ is raised to a calibrated value VELI for reduced sensitivity to false entrances. If it is not active, at step 126 the value of Target $\Delta V$ is raised to a calibrated value VEL2 to produce a higher Target Velocity. The wheel is thus allowed to run with a higher spin and thus make more use of the road surface coefficient of friction for greater vehicle acceleration. From either of steps 124 and 126 control returns to the main routine.

Figure 5:
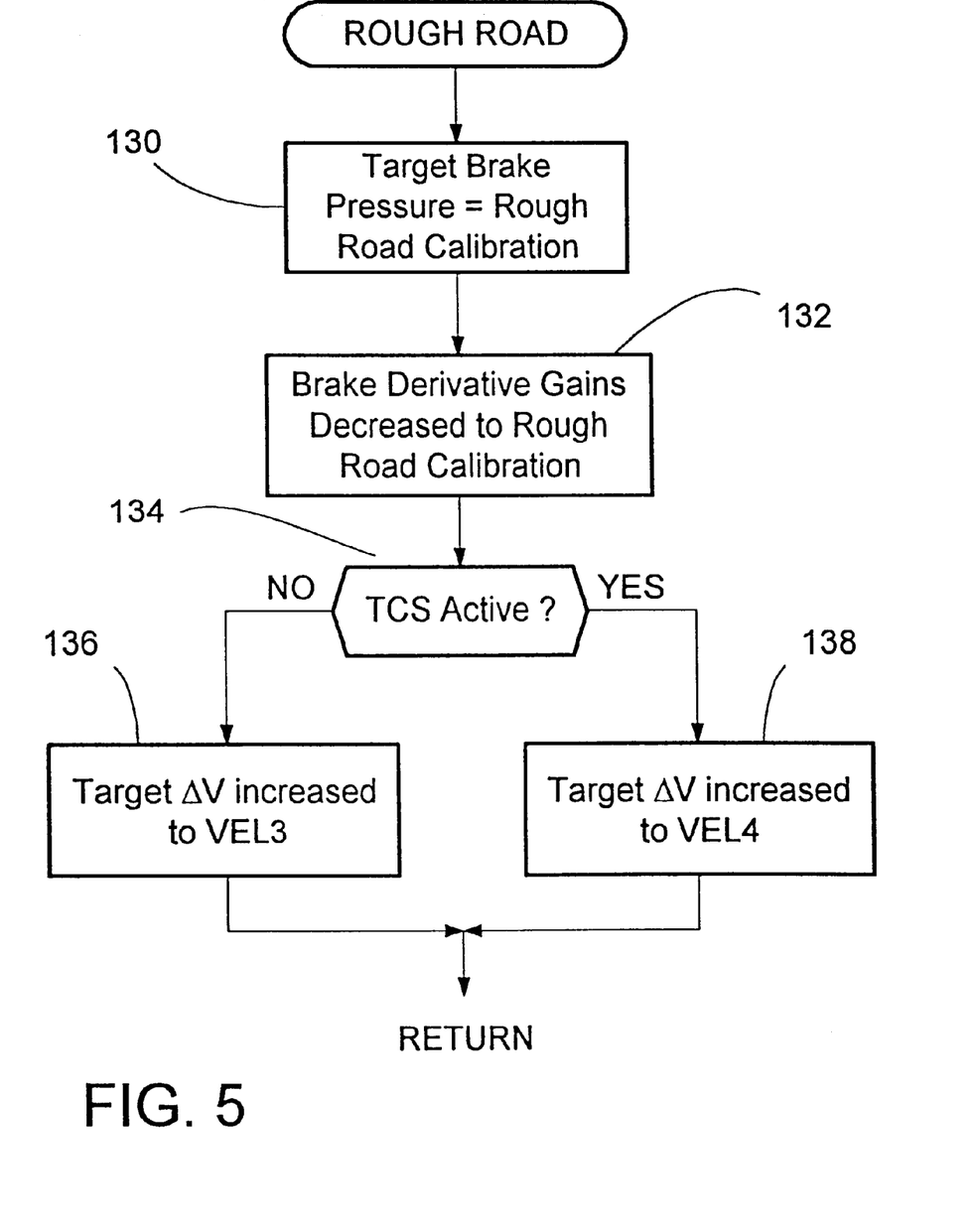

Subroutine ROUGH ROAD is described with reference to the flow chart of FIG. 5. At step 130 the value of Target Brake Pressure is set to a calibrated Rough Road value that is greater than the Coarse Road value and thus leads to an even smaller power reduction in Propulsion unit 20. At step 132 the subroutine decreases the brake derivative gain D (block 40). This reduction is due to the fact that, on a rough road surface, the driven wheel over-spinning is due more to intermittent wheel hopping or loss of normal force, which tends to produce high rotational wheel accelerations. While the input of these wheel accelerations is useful on a smooth, low coefficient surface, it is much less useful on a rough, high coefficient surface; and it is desirable to suppress their influence in the traction control. The output of summing block 36 is thus decreased so the control will be less sensitive to such rough road surface induced accelerations. At step 134 the subroutine determines if TCS is active. If it is active, at step 136 the value of Target $\Delta V$ is raised to a calibrated value VEL3 for reduced sensitivity to false entrances. If it is not active, at step 138 the value of Target $\Delta V$ is raised to a calibrated value VEL4 for increased vehicle acceleration. Typically, the values of VEL3 and VEL 4 will each be greater than the value of its counterpart VEL1 and VEL2, respectively, in subroutine COARSE ROAD. From either of steps 136 and 138 control returns to the main routine.

Figure 6:
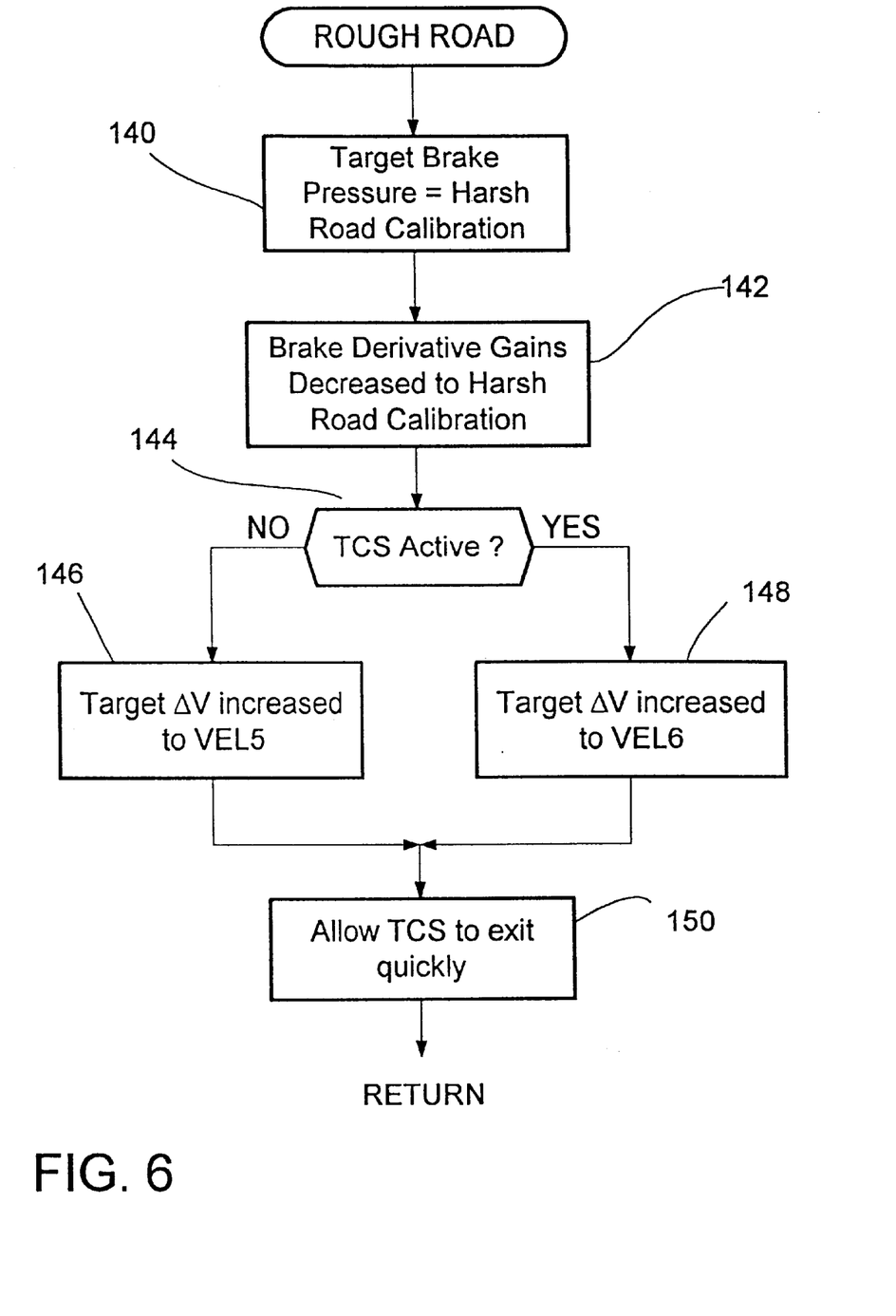

Subroutine HARSH ROAD is described with reference to the flow chart of FIG. 6. At step 140 the value of Target Brake Pressure is set to a calibrated Harsh Road value that is greater than the Rough road value and thus produces the smallest reduction in power from propulsion unit 20. At step 142 the subroutine decreases the brake derivative gain D (block 40) to a value less than that produced in step 132 of the ROUGH road subroutine so the control will be even less sensitive to road surface induced wheel accelerations. At step 144 the subroutine determines if TCS is active. If it is active, at step 146 the value of Target $\Delta V$ is raised to a calibrated value VEL5 for reduced sensitivity to false entrances. If it is not active, at step 148 the value of Target $\Delta V$ is raised to a calibrated value VEL6 for increased vehicle acceleration. Typically, the values of VEL5 and VEL 6 will each be greater than the value of its counterpart VEL3 and VEL4, respectively, in subroutine ROUGH ROAD. From either of steps 146 and 148, the subroutine proceeds to step 150, wherein TCS is allowed to exit quickly so that false entrances do not result in long activations. In normal circumstances, the changes produced by TCS are ramped out when the undriven wheel speed is reduced to the Target Velocity so as to prevent a premature ending of control allowing an immediate, repeated run-up of wheel speed. But on a harsh road surface, this ramp out is shortened or eliminated. From step 150 control returns to the main routine.

Figure 7:
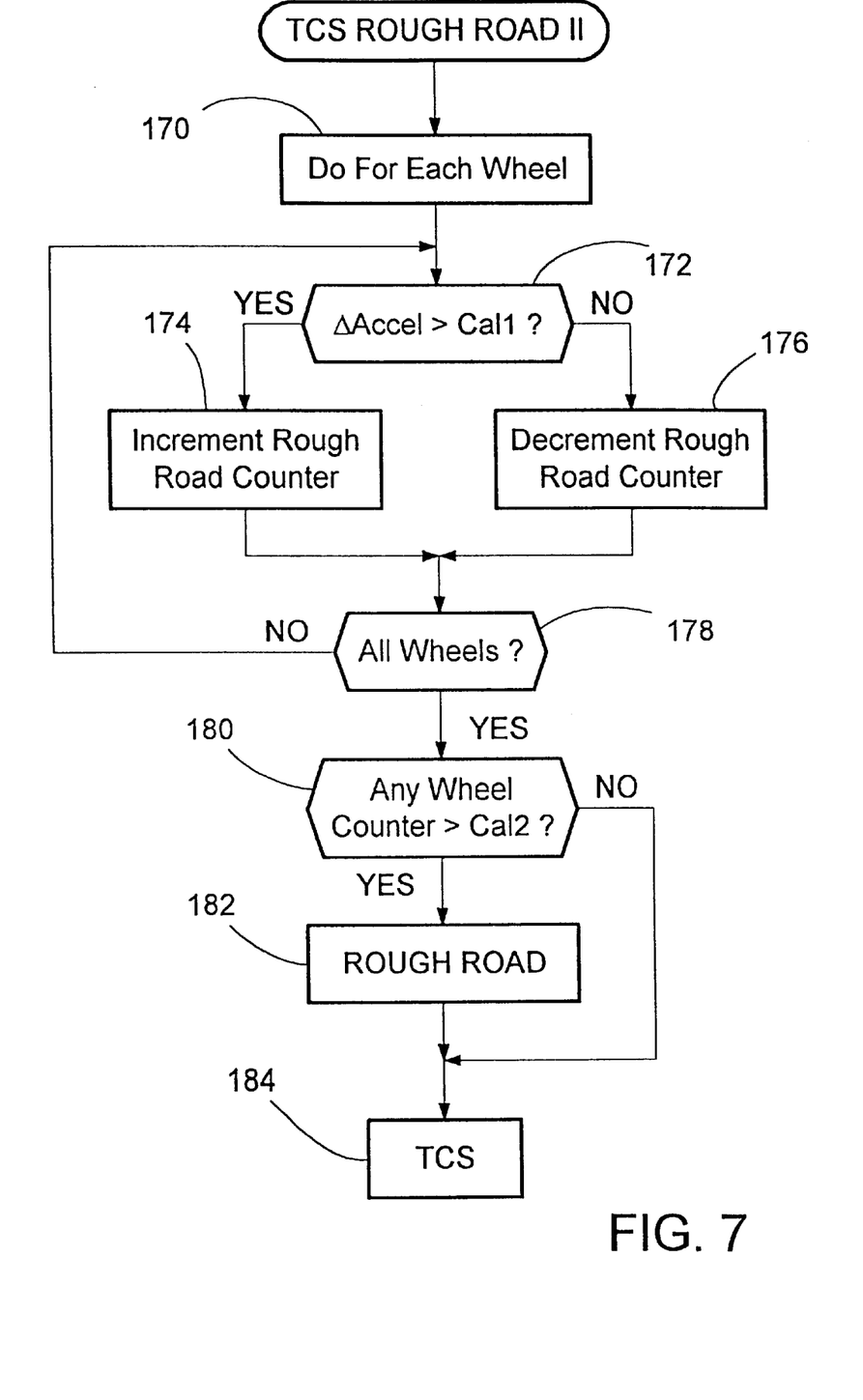
FIGS. 7 and 8 are flow charts showing alternative embodiments of a traction control system according to the invention for use in the vehicle of FIG. 1.

An alternative embodiment of the traction control of this invention not requiring a suspension control system input is shown in the flow chart of FIG. 7. The embodiment is shown as a separate routine but would actually be integrated into the TCS system of FIG. 2 during the software coding process. Routine TCS ROUGH ROAD II begins at step 170 in a loop, performing the loop once for each wheel of the vehicle. The action of the loop begins at step 172, in which the delta acceleration value $\Delta$Accel is compared with a calibrated reference value CAL1. The value $\Delta$Accel is the rotational acceleration of the chosen wheel, and it will generally be greater if the normal force between the wheel and the road surface is intermittent due to a rough road surface. If the value of $\Delta$Accel is greater than the reference, a Rough Road Counter for the wheel is incremented at step 174; otherwise the Counter is decremented (but not below zero) at step 176. At step 178, it is determined if all wheels have been examined. If not, the loop is repeated for the next wheel. But when all wheels have been examined, the routine proceeds to step 180 and determines if the Rough Road Counter for any wheel exceeds a calibrated value CAL2. If so, a rough road is determined and the routine calls subroutine ROUGH ROAD, which has been described with reference to FIG. 5. It should be noted that "rough road" in this embodiment is any level of roughness greater than smooth. Since this method of determining road roughness from wheel speeds has significantly less resolution than can be obtained from a signal derived from suspension components such as damper position or velocity signals, the embodiment does not attempt to define different levels of roughness (coarse, rough, harsh) as does the embodiment of FIG. 3. But such levels could be defined if resolution were to be improved. In any case, either from step 182 or from step 180 if no wheel Rough Road Counter exceeds CAL2, the routine proceeds to step 184 in which the normal TCS routine for a smooth road, as shown in FIG. 2, is performed.

Figure 8:
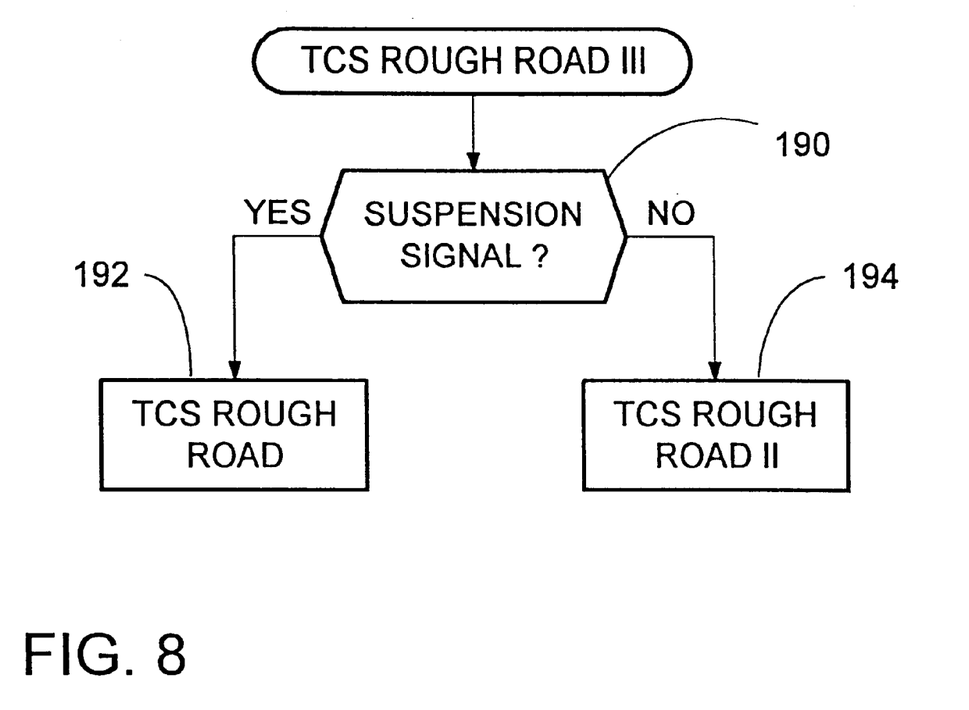

It may be advantageous to provide a common TCS system capable of being applied to vehicles having rough road signal capability from suspension components and vehicles having no such capability. The main routine of such a system is shown in the flow chart FIG. 8. Routine TCS ROUGH ROAD III begins at step 190 by determining if a suspension component based signal is available. This information could be embedded in the control permanently in a calibration datum or it could be determined by looking in a predetermined location for such a signal and detecting its presence or absence. Regardless of how it is determined, if the answer is yes, the routine calls routine TCS ROUGH ROAD at step 192 and uses the suspension component based rough road signal. But if the answer at step 190 is no, the routine calls routine TCS ROUGH ROAD III at step 194 and determines a rough road condition from wheel speeds.

What is claimed is:

1. A method for controlling the traction of a driven wheel included in a plurality of wheels supporting a vehicle on a road surface, the vehicle having a propulsion unit for supplying power to the driven wheel and a brake for braking the driven wheel, the method comprising the steps:

providing a road roughness signal indicating a level of roughness of the road surface;

when the road roughness signal indicates a first level of road roughness, modulating brake pressure to the driven wheel to maintain the speed of the driven wheel at a first target wheel speed greater than an undriven wheel speed of the vehicle by a first calibrated delta target wheel speed value and providing a first level of power reduction to the driven wheel from the vehicle propulsion unit; and when the road roughness signal indicates a second level of road roughness greater than the first level of road roughness, modulating brake pressure to the driven wheel of the vehicle to maintain the speed of the driven wheel at a second target wheel speed greater than an undriven wheel speed of the vehicle by a second calibrated delta target wheel speed value greater than the first calibrated delta target wheel speed value and providing a second level of power reduction to the driven wheel from the propulsion unit, the second level of power reduction being less than the first level of power reduction.

2. The method of claim 1 wherein the road roughness signal is derived from sensed relative vertical movement between a body of the vehicle and at least one of the plurality of wheels.

3. The method of claim 1 wherein the road roughness signal is derived from a sensed wheel speed of at least one of the plurality of vehicle wheels.

4. The method of claim 1 further comprising the steps:

modulating brake pressure to the driven wheel in response to a time derivative of a difference between a rotational wheel acceleration of the driven wheel and an undriven wheel rotational acceleration, the time derivative having a derivative gain;

when the road roughness signal indicates a third level of road roughness, providing a first gain value for the derivative gain; and when the road roughness signal indicates a fourth level of road roughness greater than the third level of road roughness, providing a second gain value for the derivative gain that is lower in magnitude than the first gain value.

5. A method for controlling the traction of a driven wheel included in a plurality of wheels supporting a vehicle on a road surface, the vehicle having a propulsion unit for supplying power to the driven wheel and a brake for braking the driven wheel, the method comprising the steps:

responsive to a target velocity error between a target velocity and a measured rotational velocity of the driven wheel, commanding a brake pressure to the driven wheel tending to reduce the target velocity error and providing a signal indicative of the commanded brake pressure;

providing a road roughness signal indicating a level of roughness of the road surface;

responsive to a difference between the signal indicative of the commanded brake pressure and a first target brake pressure, reducing power to the driven wheel from the propulsion unit by a first amount when the road roughness signal indicates a first level of road roughness but alternatively reducing power to the driven wheel from the propulsion unit by a second amount less than the first amount when the road roughness signal indicates a second level of road roughness greater than the first level of road roughness.

6. A traction control for a driven wheel included in a plurality of wheels supporting a vehicle on a road surface, the vehicle having a propulsion unit for supplying power to the driven wheel and a brake for braking the driven wheel, the traction control comprising:

a road roughness sensor having a signal output indicating a level of roughness of the road surface;

means responsive to the signal output of the road roughness sensor indicating a first level of road roughness for modulating brake pressure to the driven wheel to maintain the speed of the driven wheel at a first target wheel speed greater than an undriven wheel speed of the vehicle by a first calibrated delta target wheel speed value and providing a first level of power reduction to the driven wheel from the vehicle propulsion unit; and means responsive to the signal output of the road roughness sensor indicating a second level of road roughness greater than the first level of road roughness, modulating brake pressure to the driven wheel of the vehicle to maintain the speed of the driven wheel at a second target wheel speed greater than an undriven wheel speed of the vehicle by a second calibrated delta target wheel speed value greater than the first calibrated delta target wheel speed value and providing a second level of power reduction to the driven wheel from the propulsion unit, the second level of power reduction being less than the first level of power reduction.

7. The traction control of claim 6 wherein the road roughness sensor comprises at least one relative vertical position sensor between a body of the vehicle and at least one of the plurality of wheels.

8. The method of claim 6 wherein the road roughness sensor comprises at least one wheel speed sensor responsive to one of the plurality of vehicle wheels.

9. The traction control of claim 6 further comprising:

a brake pressure modulator for the driven wheel responsive to a time derivative of a difference between a rotational wheel acceleration of the driven wheel and an undriven wheel rotational acceleration, the time derivative having a derivative gain;

means responsive to the output signal of the road roughness sensor indicating a third level of road roughness for providing a first gain value for the derivative gain; and means responsive to the output signal of the road roughness signal indicating a fourth level of road roughness greater than the third level of road roughness for providing a second gain value for the derivative gain that is lower in magnitude than the first gain value.

10. Apparatus for controlling the traction of a driven wheel included in a plurality of wheels supporting a vehicle on a road surface, the vehicle having a propulsion unit for supplying power to the driven wheel and a brake for braking the driven wheel, the apparatus comprising:

means responsive to a target velocity error between a target velocity and a measured rotational velocity of the driven wheel for commanding a brake pressure to the driven wheel tending to reduce the target velocity error and for providing a signal indicative of the commanded brake pressure;

means for providing a road roughness signal indicating a level of roughness of the road surface; and means responsive to a difference between the signal indicative of the commanded brake pressure and a first target brake pressure for reducing power to the driven wheel from the propulsion unit by a first amount when the road roughness signal indicates a first level of road roughness but alternatively reducing power to the driven wheel from the propulsion unit by a second amount less than the first amount when the road roughness signal indicates a second level of road roughness greater than the first level of road roughness.

* * * * *